US010296332B2

(12) United States Patent
Candelaria et al.

(10) Patent No.: US 10,296,332 B2
(45) Date of Patent: *May 21, 2019

(54) SYSTEMS AND METHODS FOR SELECTIVELY ENABLING AND DISABLING HARDWARE FEATURES

(71) Applicant: International Business Machines Corporation, Armonk, NY (US)

(72) Inventors: Susan K. Candelaria, Tucson, AZ (US); John R. Paveza, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 197 days.

This patent is subject to a terminal disclaimer.

(21) Appl. No.: 15/146,781

(22) Filed: May 4, 2016

(65) Prior Publication Data

US 2016/0246596 A1 Aug. 25, 2016

Related U.S. Application Data

(63) Continuation of application No. 14/064,040, filed on Oct. 25, 2013, now Pat. No. 9,400,679, which is a
(Continued)

(51) Int. Cl.
*G06F 9/22* (2006.01)
*G06F 9/46* (2006.01)
(Continued)

(52) U.S. Cl.
CPC ............. *G06F 9/226* (2013.01); *G06F 8/61* (2013.01); *G06F 9/4411* (2013.01); *G06F 9/468* (2013.01);
(Continued)

(58) Field of Classification Search
CPC ............ G06F 11/2247; G06F 11/3051; G06F 11/327; G06F 13/22; G06F 13/426;
(Continued)

(56) References Cited

U.S. PATENT DOCUMENTS 5,170,472 A * 12/1992 Cwiakala .............. G06F 15/161
710/8
7,886,031 B1 2/2011 Taylor et al.
(Continued)

OTHER PUBLICATIONS

Candelaria et al., U.S. Appl. No. 15/146,819, filed May 4, 2016.
(Continued)

*Primary Examiner* — June Y Sison
(74) *Attorney, Agent, or Firm* — Zilka-Kotab, P.C.

(57) ABSTRACT

In one embodiment, a computer program product includes a computer readable storage medium having stored/encoded thereon: first program instructions executable by a device to cause the device to define a hardware feature policy for one or more hardware components of a system; and second program instructions executable by the device to cause the device to enable and/or disabling one or more hardware features of one or more of the hardware components based on the hardware feature policy, where the hardware feature policy comprises instructions to enable and/or disable access to the one or more hardware features based on one or more criteria.

2 Claims, 3 Drawing Sheets

Related U.S. Application Data continuation of application No. 13/797,809, filed on Mar. 12, 2013, now Pat. No. 9,400,678.

(51) Int. Cl.

| | |
|---|---|
| *G06F 8/61* | (2018.01) |
| *H04L 29/06* | (2006.01) |
| *G06F 9/4401* | (2018.01) |
| *G06F 11/22* | (2006.01) |
| *G06F 11/30* | (2006.01) |
| *G06F 11/32* | (2006.01) |
| *G06F 13/22* | (2006.01) |
| *G06F 13/42* | (2006.01) |
| *H04L 12/24* | (2006.01) |

(52) U.S. Cl.
CPC ...... *G06F 11/2247* (2013.01); *G06F 11/3051* (2013.01); *G06F 11/327* (2013.01); *G06F 13/22* (2013.01); *G06F 13/426* (2013.01); *H04L 65/102* (2013.01); *H04L 41/02* (2013.01)

(58) Field of Classification Search
CPC .......... G06F 8/61; G06F 9/226; G06F 9/4411; G06F 9/468; H04L 41/02; H04L 65/102
See application file for complete search history.

(56) References Cited

U.S. PATENT DOCUMENTS

| | | |
|---|---|---|
| 9,400,678 B2 | 7/2016 | Candelaria et al. |
| 9,400,679 B2 | 7/2016 | Candelaria et al. |
| 9,811,345 B2 * | 11/2017 | Oliver .................. G06F 9/4401 |
| 2008/0126857 A1 | 5/2008 | Basham et al. |
| 2008/0288238 A1 | 11/2008 | Heller, Jr. |
| 2010/0251252 A1 | 9/2010 | Laverone et al. |
| 2011/0320637 A1 | 12/2011 | Coneski et al. |
| 2011/0320640 A1 | 12/2011 | Butler et al. |
| 2011/0320825 A1 | 12/2011 | Greiner et al. |
| 2012/0093149 A1 | 4/2012 | Blair et al. |
| 2012/0317388 A1 | 12/2012 | Driever et al. |
| 2014/0280815 A1 | 9/2014 | Candelaria et al. |
| 2014/0280842 A1 | 9/2014 | Candelaria et al. |
| 2016/0246694 A1 | 8/2016 | Candelaria et al. |

OTHER PUBLICATIONS

Decision on Appeal from U.S. Appl. No. 11/565,411, Appeal No. 2011-004811 dated Jan. 3, 2014.
Candelaria et al., U.S. Appl. No. 13/797,809, filed Mar. 12, 2013.
Non-Final Office Action from U.S. Appl. No. 13/197,809, dated Aug. 28, 2015.
Candelaria et al., U.S. Appl. No. 14/064,040, filed Oct. 25, 2013.
Non-Final Office Action from U.S. Appl. No. 14/064,040 dated Aug. 26, 2015.
Drummond, "System z and Storage Synergy: A view through the decades and into the future" Spring Share Session #8958, IBM, 2011, pp. 1-36.
Komornicki et al., "Roadrunner: Hardware and Software Overview," IBM, ibm.com/redbooks, Redpaper, Jan. 2009, pp. 1-50.
Pullen et al., "Security Mechanism for Restricting the Use of Software to Specific Hardware Platforms," Motorola, Inc. 2000, Motorola TDB, IPCOM000009792D, May 1, 2000, pp. 93-96.
Singh et al., "FICON Planning and Implementation Guide," IBM Redbooks, Mar. 2012, 526 pages.
Sivaram et al., "Efficient Embedded Memory Testing With APG," IEEE, ITC International Test Conference Paper 2.3, 2002, pp. 47-54.
Final Office Action from U.S. Appl. No. 13/797,809, dated Feb. 1, 2016.
Final Office Action from U.S. Appl. No. 14/064,040, dated Feb. 1, 2016.
Singh et al., "I/O Configuration using z/OS HCD and HCM," IBM Redbook, Apr. 2010, pp. 1-462.
Westphal et al., "IBM System Storage DS8000 Architecture and Implentation," IBM Redbooks, Nov. 2012, pp. 1-534.
Rogers et al., "z/OS Version 1 Release 13 Implementation," IBM Redbooks, Mar. 2012, pp. 1-926.
IBM, "z/Architecture Principles of Operation," Sep. 2012, pp. 1-1568.
Decision on Appeal and Decision on Request for Rehearing from U.S. Appl. No. 11/855,934, Appeal No. 2011-005628, dated Sep. 14, 2007.
Notice of Allowance from U.S. Appl. No. 14/064,040, dated Apr. 22, 2016.
Notice of Allowance from U.S. Appl. No. 13/797,809, dated Apr. 25, 2016.
Non-Final Office Action from U.S. Appl. No. 15/146,819, dated Apr. 16, 2018.
Final Office Action from U.S. Appl. No. 15/146,819, dated Sep. 7, 2018.
Notice of Allowance from U.S. Appl. No. 15/146,819, dated Jan. 3, 2019.
Corrected Notice of Allowance from U.S. Appl. No. 15/146,819, dated Feb. 6, 2019.

* cited by examiner

SYSTEMS AND METHODS FOR SELECTIVELY ENABLING AND DISABLING HARDWARE FEATURES

BACKGROUND

The present invention relates to management of hardware components in a computer system architecture, and particularly to selectively enabling and disabling hardware features of hardware components in a computer system architecture.

In native IBM computer z/architecture using the IBM z/OS or other IBM operating systems (OSs), I/O operations are complex and require logic to be applied to the data to locate it on storage devices such as direct access storage devices (DASDs), to block and unblock access to the data, and to provide other similar functions via hardware features of hardware components in the computer architecture.

Conventionally, software operating in a computer system architecture exploits all hardware features of various hardware components in the computer system architecture upon the features becoming available. For example, IO Drivers typically build I/O channel programs (a sequence of read and write requests) based on the capabilities of the hardware. In most instances, this capability-based hardware feature enablement ensures ease of access to all available hardware features and full functionality of all hardware components across the computer system architecture.

However, in some instances, it may be disadvantageous to enable all hardware features of the hardware components forming a computer system architecture. For example, hardware features may be characterized as unreliable, unstable, undesirable or even unnecessary for certain applications. Similarly, software error recovery procedures designed to handle new hardware features may not perform properly, and/or may introduce additional errors impeding the use of particular hardware features. As a result, a user may wish to exclude suspect hardware features from operating within the computer system architecture in order to avoid such problems while retaining all remaining functionality available to the computer system architecture.

Currently, a user or system administrator may address the aforementioned problems by disabling or enabling all hardware features across the entire computer system architecture. However, this approach requires the entire system to be taken offline in order to disable even a single hardware feature, resulting in undesirable loss of available resources. There is no ability to selectively enable or disable individual hardware features for one or more of the hardware components while retaining all remaining functionality available to the computer system architecture.

Alternatively, users may install new microcode to the hardware components in an attempt to address the issue, but this process also requires significant and undesirable downtime while the microcode is installed for the computer system architecture.

Accordingly, in order to provide more robust computer system architecture operation and improve availability of hardware features across a computer system architecture despite one or more malfunctioning hardware components and/or features, it would be beneficial to develop and disclose systems, methods and computer program products for selectively enabling and/or disabling individual hardware features of a computer system architecture without needing to enable or disable all hardware features available to the entire computer system architecture.

BRIEF SUMMARY

In one embodiment, a computer program product includes a computer readable storage medium having stored/encoded thereon: first program instructions executable by a device to cause the device to define a hardware feature policy for one or more hardware components of a system; and second program instructions executable by the device to cause the device to enable and/or disabling one or more hardware features of one or more of the hardware components based on the hardware feature policy, where the hardware feature policy comprises instructions to enable and/or disable access to the one or more hardware features based on one or more criteria.

In another embodiment, a system includes: a processor and logic integrated with and/or executable by the processor, the logic being configured to: define a hardware feature policy for one or more hardware components of a system; and enable and/or disable one or more hardware features of one or more of the hardware components based on the hardware feature policy, where the hardware feature policy comprises instructions to enable and/or disable access to the one or more hardware features based on one or more criteria.

Other aspects and embodiments of the present invention will become apparent from the following detailed description, which, when taken in conjunction with the drawings, illustrates by way of example the principles of the invention.

DETAILED DESCRIPTION

Figure 1:
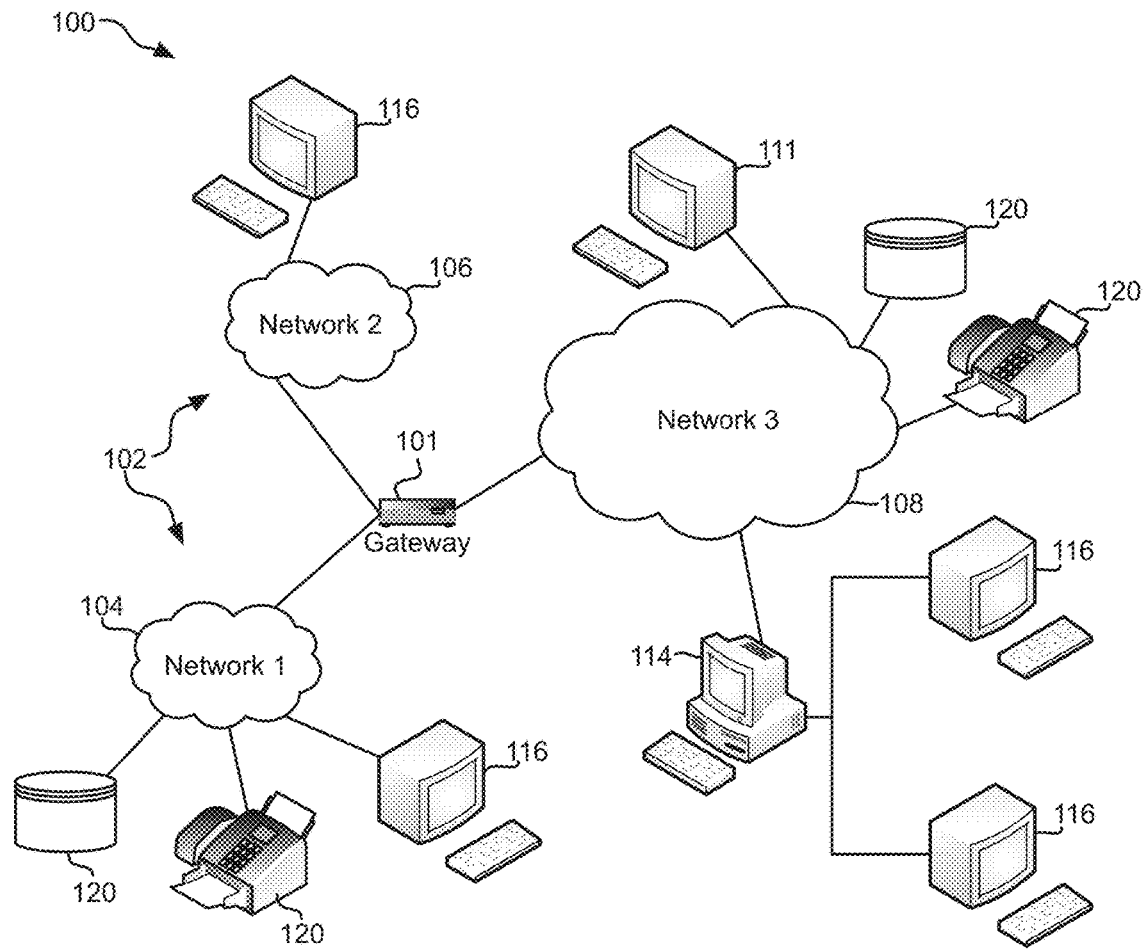
FIG. 1 illustrates a system architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for controlling the introduction, visibility and/or enabled/ disabled state of individual hardware features on systems via a simple software tool. Embodiments provide ways to control which hardware features are visible to software. This allows a user to enable features one-by-one based on their level of confidence.

In order to avoid these problems, in one general embodiment, a method includes: defining a hardware feature policy for one or more hardware components of a system; and enabling and/or disabling one or more hardware features of one or more of the hardware components based on the hardware feature policy, where the hardware feature policy comprises instructions to enable and/or disable access to the one or more hardware features based on one or more criteria selected from the group consisting of: a feature access schedule; a volume feature access group; a job feature access group; and an user feature access group.

In another general embodiment, a computer program product includes a computer readable storage medium having stored/encoded thereon: first program instructions executable by a device processor to cause the device to define a hardware feature policy for one or more hardware components of a system; and second program instructions executable by the device to cause the device to enable and/or disabling one or more hardware features of one or more of the hardware components based on the hardware feature policy, where the hardware feature policy comprises instructions to enable and/or disable access to the one or more hardware features based on one or more criteria selected from a group consisting of: a feature access schedule; a volume feature access group; a job feature access group; and an user feature access group.

In another general embodiment, a system includes: a processor and logic integrated with and/or executable by the processor, the logic being adapted to: define a hardware feature policy for one or more hardware components of a system; and enable and/or disable one or more hardware features of one or more of the hardware components based on the hardware feature policy, where the hardware feature policy comprises instructions to enable and/or disable access to the one or more hardware features based on one or more criteria selected from a group consisting of: a feature access schedule; a volume feature access group; a job feature access group; and an user feature access group.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
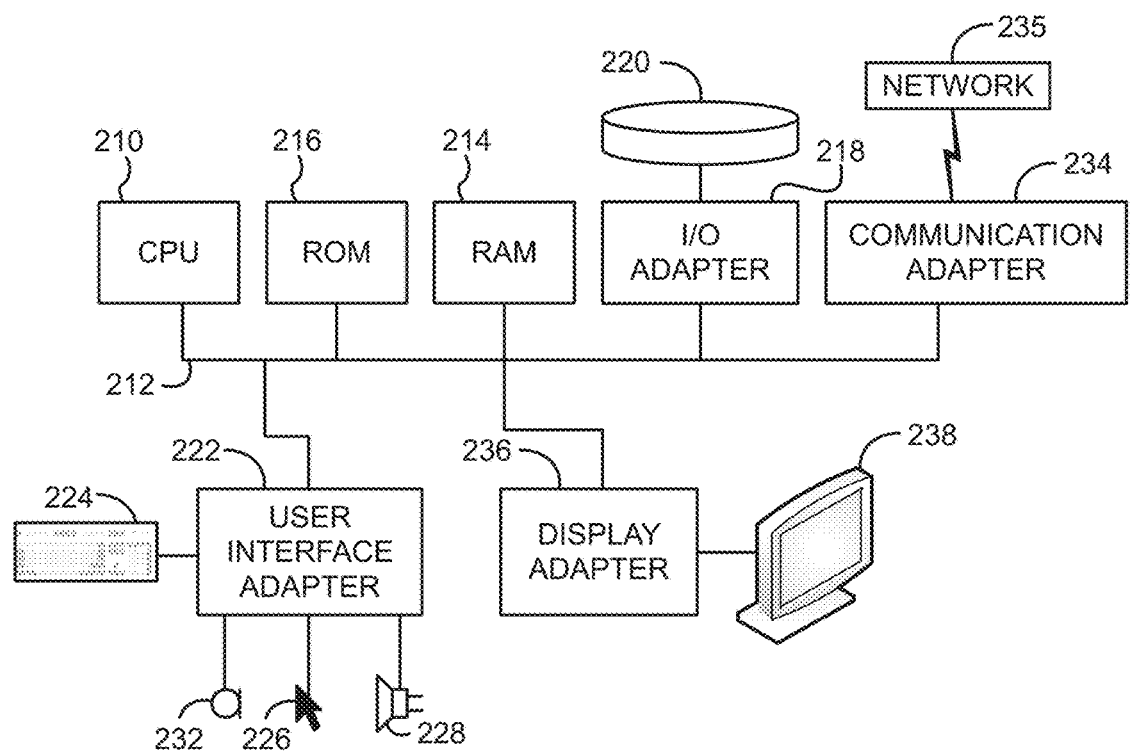
FIG. 2 shows a representative hardware environment that may be associated with the systems of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

For the sake of brevity, the descriptions provided herein refer to network communications, and in particular to fibre channel communications, but the embodiments and approaches described herein may be applicable to any communication protocol.

It will further be appreciated that embodiments presented herein may be provided in the form of a service deployed on behalf of a customer to offer service on demand.

In systems in which a host system communicates with one or more hardware systems or components over Fibre Channel (FC) networks, Fibre Channel Protocol (FCP) operations may be used as a transport protocol between the systems. In addition, some systems may use a higher level protocol referred to herein as Fibre Channel extensions (FCX) which may include IBM zSeries High Performance Fibre Connectivity (FICON), also referred to as zHPF, e.g., ANSI FC-SB-3 Single-Byte Command Code Sets-3 Mapping Protocol for FC protocol; National Committee for Information Technology Standards (NCITS) T11/FC-SB-4 Transport Mode operation, etc.

Figure 3:
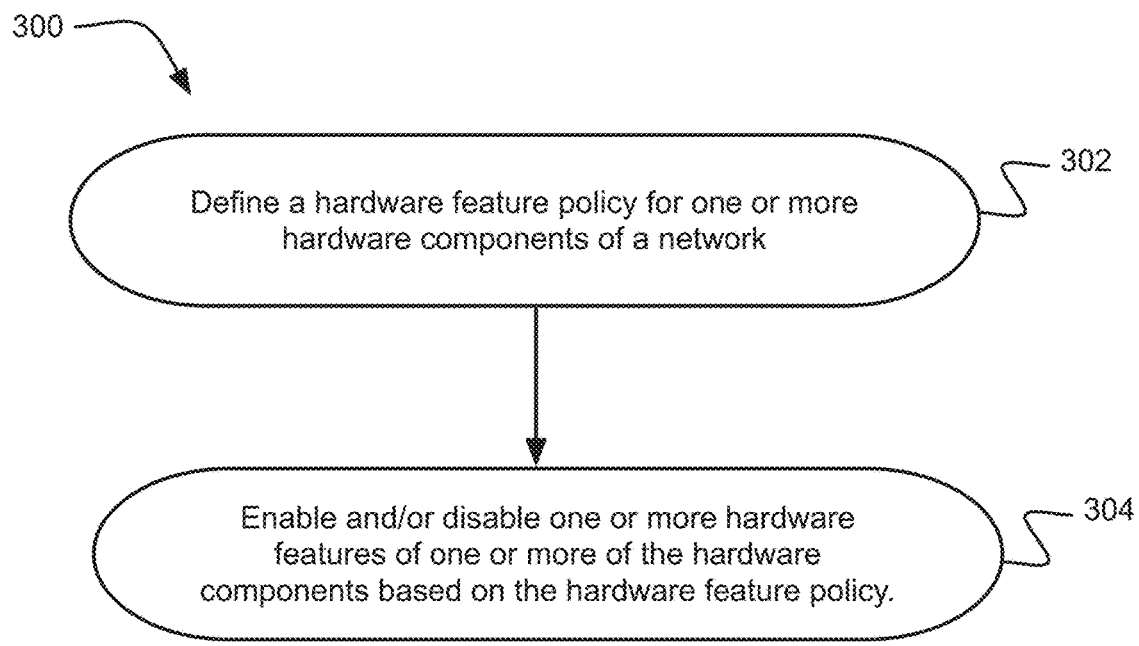
FIG. 3 is a flow diagram of a method, according to one embodiment.

Now referring to FIG. 3, a method 300 is shown for processing a command request, according to one embodiment. Of course, the method 300 may include more or fewer operations than those described below and shown in FIG. 3, as would be apparent to one of skill in the art upon reading the present descriptions.

In operation 302, a hardware feature policy is defined for one or more hardware components of one or more systems, according to one approach, where the system(s) may be part of a computer system architecture having multiple systems and a communication mechanism such as a network. For example, such hardware components may be any hardware components of any device, including subcomponents thereof, e.g., as shown in FIG. 2. Moreover, the systems may be any type of systems, such as those shown in FIGS. 1 and 2.

Defining a hardware feature policy may be accomplished by any known methodology, such as receiving a user-defined hardware feature policy, receiving an automatically-generated hardware feature policy, modifying a preexisting hardware feature policy, generating a new hardware feature policy, etc. as would be understood by one having ordinary skill in the art upon reading the present descriptions. Preferably, defining a hardware feature policy includes receiving or providing instructions to enable access to at least some of the hardware features of at least one hardware component in a computer system architecture and further receiving or providing instructions to disable access to at least some of the hardware features for at least one other hardware component in the computer system architecture.

In one instance, defining a hardware feature policy may include receiving microcode comprising one or more new feature codes; receiving a notification (e.g. a state change interrupt or an unsolicited interrupt) associated with the microcode at a host device in communication with the network; determining whether any of the new feature codes pertain to one or more of the hardware features and/or hardware components in communication with the host device based on a query; and updating one or more host control blocks of the host device with the pertinent new feature code(s) in response to determining the new feature codes pertain to one or more of the hardware features and/or hardware components in communication with the host device.

As understood herein, feature codes "pertain to" hardware components whenever the feature code impacts the function of hardware features associated with and/or integrated into the hardware component. For example, in one approach feature codes "pertain to" hardware components when such feature codes are required to enable a given hardware feature or features. In another approach, feature codes "pertain to" hardware components when such feature codes are recommended for desirable and/or optimal performance of hardware featured by a particular hardware component. Of course, feature codes may "pertain to" hardware components in other manners as would be appreciated by one having ordinary skill in the art upon reading the present descriptions.

Moreover, in one embodiment, a function enabling access to data on a storage medium (e.g. an Access Method such as basic direct access method or "BDAM," basic sequential access method or "BSAM," queued sequential access method or "QSAM," etc. as would be understood by one having ordinary skill in the art upon reading the present descriptions) may query the status of various hardware features enabled and/or disabled for a group and build a channel program based on the set of hardware features that are enabled. Such queries may be conducted according to a predetermined protocol, such as querying in response to particular types of I/O requests (e.g. read, write, FICON read, FICON write, HPF read, HPF write, etc.), querying for each I/O request, querying for I/O requests submitted to a particular hardware component, etc. as would be understood by one having ordinary skill in the art upon reading the present descriptions). Preferably, queries are directed to obtain information regarding all feature codes enabled for a particular hardware component.

As understood herein, the hardware feature policy includes instructions to enable and/or disable hardware features, which can be any feature of any hardware component. Access to hardware features may be enabled and/or disabled with respect to individual hardware components, with respect to hardware feature type (with or without respect to hardware components), with respect to a logical subsystem (e.g. a group of volumes), etc. as would be understood by one having ordinary skill in the art upon reading the present descriptions.

In some approaches, the hardware feature policy may include instructions to enable and/or disable hardware features based on one or more criteria.

Such criteria may include a feature access schedule, according to one embodiment. For example, a feature access schedule may include a time of day when features should be enabled or disabled.

In another embodiment, criteria may include a volume feature access group, such as a set of volumes (physical and/or logical) that are affected by the hardware feature policy (e.g. a Storage Group, set of Logical Subsystem IDs, set of volumes having at least a minimum available storage space, set of volumes having access to a particular set of resources such as minimum processing power, memory, CPU availability, etc.).

In yet another embodiment, criteria may additionally and/or alternatively include a job feature access group. For example, job feature access group(s) may be a set of job types that are allowed/denied access to particular hardware features such as based on user-defined job priority, job type, job name, jobs having a flag set designating a job type, job origin point (user, workstation, IP, etc.) etc. as would be understood by one having ordinary skill in the art upon reading the present descriptions. In some approaches, job priority, type, name, and/or flags may be defined by a user (e.g. in a hardware policy).

In still yet another embodiment, criteria may include an user feature access group, such as groups defined according to types of users (e.g. admin, user, guest, etc.), according to username, according to user account permissions (e.g. different security levels, etc.), according to user category (finance, software development, IT, engineering, etc.), etc. would be understood by a person having ordinary skill in the art upon reading the present descriptions.

In one embodiment, the hardware feature policy may be defined by a user, e.g. via a graphical-user interface (GUI), via a command-line interface (CLI), via a hardware feature policy file designating the features to be enabled and/or disabled for various hardware components of the computer system architecture, etc. as would be understood by one having ordinary skill in the art upon reading the present descriptions.

In operation 304, one or more hardware features of one or more of the hardware components are enabled and/or disabled based on the hardware feature policy, according to one embodiment.

In one approach, enabling and/or disabling hardware features involves setting and/or removing one or more flags in a control block mask, respectively. Moreover, in some approaches each flag may correspond to one or more of the hardware features, and preferably each flag in the control block mask may correspond to one hardware feature. Each control block may have associated therewith a mask, the mask defining criteria such as users, user sets, storage groups, logical subsystem IDs, etc. and features accessible by a given user, user set, storage group, logical subsystem ID, etc. as would be understood by one having ordinary skill in the art upon reading the present descriptions.

In more approaches, disabling hardware features may include masking feature codes indicating that a hardware component is configured to utilize a particular hardware feature. In this manner, the system may be prevented from recognizing that the hardware component is capable of performing the particular hardware feature, and thus the corresponding hardware feature is considered "disabled." Similarly, enabling hardware features may include removing the mask from disabled features such that the corresponding features may be recognized as enabled. Exemplary systems as described herein may determine whether a feature code is masked (i.e. whether a hardware feature is enabled or disabled) based on a query submitted by the host device, as described in further detail herein.

In some embodiments, it may be advantageous to define or modify a feature policy in response to installing new microcode, and/or in response to detecting installation of new microcode, for one or more hardware components of the computer system architecture. For example, a user may have previously disabled certain hardware features due to real or perceived instability, unreliability, etc. of the corresponding feature and/or hardware component(s). However, at a later time the user may have been provided with new microcode resolving the real or perceived problems. Upon installing the new microcode and optionally verifying the stability and/or reliability of the suspect hardware features, a new or modified hardware feature policy may be defined such as to enable the previously disabled hardware features. In one embodiment, microcode may comprise licensed internal code (LIC).

In another example, method 300 may additionally and/or alternatively include further operations such as receiving a request to perform an operation using one or more of the hardware features. As will be appreciated by the skilled artisan reading the present disclosures, the request may be received in any suitable manner, may pertain to performing any operation and may request to perform the operation using any of the hardware features.

Furthermore, method 300 may also include performing the one or more requested operations using the corresponding hardware feature(s) upon either determining that the hardware features are enabled for the hardware components; updating one or more host control blocks (e.g. with new microcode), or both, in various embodiments. As will be appreciated by one having ordinary skill in the art, host control blocks may be updated in any suitable manner, but in one approach host control block updates are an asynchronous process.

In this manner, it is possible to establish an automated or semi-automated pipeline for maintaining microcode updates according to requested functionality of the computer system architecture. As will be described below with reference to a hypothetical example, systems within the scope of the present disclosures may receive a request to perform an operation, determine the operation cannot be performed (e.g. because the corresponding feature is disabled), enable the operation to be performed (e.g. by installing new microcode enabling the feature) and perform the operation without any input from a user other than the request.

For instance, in one hypothetical example a user requests an operation be performed using a particular hardware feature of a chosen hardware component. The user may be unaware of whether the feature is enabled or disabled for the chosen hardware component upon submitting the request. Regardless, the system may determine whether the feature is enabled or disabled, and perform the operation using the feature upon determining it is enabled. Conversely, the system may determine that the feature is disabled, and build a channel program that does not exploit the disabled feature. However, if the system determines that new microcode is available and includes a new feature, the system may update corresponding host control blocks in the computer system architecture with a feature flag that corresponds to the new hardware feature. In some instances the newly installed microcode may be utilized in conjunction with instructions to enable the previously disabled feature, in which case the system may determine that the feature is now enabled and proceed with performing the requested operation using the newly-enabled feature.

In particularly advantageous approaches, enabling access to the one or more hardware features such as in operation 304 of method 300 enables the computer system architecture to access to a plurality of discontiguous memory locations (e.g., pages, files, etc.) via a single channel program. In contrast, conventional methods of enabling/disabling hardware features require a unique channel program to access each discontiguous memory location. By providing the ability to access a plurality of discontiguous memory locations, the presently disclosed methods reduce overhead required to perform hardware component features, such as reducing I/O overhead generated as a result of employing multiple channel programs.

In one exemplary embodiment, the method 300 described herein may be implemented as follows. A user may be presented with a command line interface (e.g. DEVMAN) that allows the user to enable and disable individual hardware features. For each hardware feature, a bit in a control block may be defined to represents the feature. In one approach, if the bit is ON, the corresponding feature is DISABLED and if the bit is OFF, the corresponding feature is ENABLED.

Below are several illustrative DEVMAN CLI commands within the scope of the present disclosures. Of course, the skilled artisan will appreciate that the following commands are presented by way of example, and are not to be considered limiting on the instant descriptions. Any suitable command line interface and corresponding commands may be employed in various alternative embodiments.

In one embodiment, a CLI command to enable all HPF features may take the form:
F DEVMAN,ENABLE(HPF)
16.16.50 SYSTEM1 DMO0012I DEVICE MANAGER
   ENABLE ALL HPF FEATURES In another embodiment, a CLI command to enable HPF BIDI features may take the form:
F DEVMAN,ENABLE(HPF:4)
16.15.03 SYSTEM1 DMO0012I DEVICE MANAGER
   ENABLE HPF BIDI In yet another embodiment, a CLI command to disable HPF BIDI features may take the form:
F DEVMAN,DISABLE(HPF:4)
16.15.03 SYSTEM1 DMO0012I DEVICE MANAGER
   DISABLE HPF BIDI In still another embodiment, a CLI command to disable HPF-format write features may take the form:
F DEVMAN,DISABLE(HPF:8)
16.15.38 SYSTEM1 DMO0012I DEVICE MANAGER
   ENABLE HPF FORMAT WRITES In accordance with the above-described embodiments, a CLI command to report status of enabled and/or disabled hardware features, and the corresponding report may take the form:

```
F DEVMAN,REPORT
**** DEVMAN *********************************************
* FMID:  HDZ1D10                                         *
* HPF FEATURES DISABLED:  4 8                            *
**** DEVMAN *********************************************
```

In more approaches, determining whether hardware features are enabled for a particular hardware component may include using an I/O driver to query device support code and determining whether the hardware component is capable of utilizing a particular hardware feature. Upon determining the hardware component is capable of utilizing the particular hardware feature or features, the I/O driver may build a channel program to exploit those features.

In operation, the presently disclosed methods and systems performing such methods may maintain a record of the status of hardware features for a storage group, e.g. a group of volumes. In one embodiment the record may be a list of hardware features enabled or disabled for a particular group of volumes. Thus, when a user enables or disables a hardware feature, it may be advantageous to update each storage group's record of the status of various hardware features associated with the group in order to reflect the most recent state of microcode and corresponding hardware feature stability, reliability, availability, etc.

In particularly advantageous approaches, when new hardware features become available (e.g. when new microcode is activated), software may be notified and instructed to update each group's record of the status of hardware features. In this manner, the software may facilitate enabling some hardware features previously disabled (e.g. due to problems now corrected by the new microcode) while continuing to disable other features previously disabled (e.g. hardware features not corrected, altered or affected by the new microcode).

In one approach, the method 300 may apply to a Fibre Channel protocol, such as FCP and/or FCX, as previously described. In more approaches, the method 300 may particularly apply to high performance FICON (HPF) capabilities such as conferred by the FICON Express 8S channel, which has hardware specifically designed to support HPF, especially in IBM z architectures. The FICON Express 8S channel is configured to transfer approximately 1600 megabytes (MB) of data per second in a full-duplex large sequential read/write mix, and is characterized by an I/O driver benchmark of approximately 92,000 I/O operations per second (using a 4 k block size and utilizing 100% of the channel).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising:
a non-transitory computer readable storage medium having stored/encoded thereon:
first program instructions executable by a device to cause the device to query device support code with an I/O driver;
second program instructions executable by the device to cause the device to determine whether one or more hardware features are enabled for one or more hardware components of a system based on the query;
third program instructions executable by the device to cause the device to asynchronously update in response to determining the one or more hardware features are not enabled for at least one of the one or more hardware components, a plurality of host control blocks of the at least one of the one or more hardware components to indicate the hardware features are not enabled for the at least one of the one or more hardware components;
fourth program instructions executable by the device to cause the device to verify a stability of the one or more hardware features in response to detecting the asynchronous update;
fifth program instructions executable by the device to cause the device to define, in response to verifying the stability of the hardware features, a hardware feature policy for one or more hardware components of a system;
sixth program instructions executable by the device to cause the device to build a single channel program to exploit the hardware features in response to defining the hardware feature policy;
seventh program instructions executable by the device to cause the device to enable, disable, or enable and disable hardware features of one or more of the hardware components based on the hardware feature policy, wherein the hardware feature policy comprises:
eighth program instructions executable by the device to cause the device to selectively enable access to at least some, but not all of the hardware features based on one or more of a plurality of criteria; and
ninth program instructions executable by the device to cause the device to selectively disable access to at least some, but not all of the hardware features based on one or more of the plurality of criteria; and
wherein disabling the hardware features comprises masking one or more feature codes indicating that a hardware component is configured to utilize the hardware features;
wherein enabling access to the hardware features enables access to a plurality of discontiguous memory pages via the single channel program; and
wherein the plurality of criteria comprise:
a feature access schedule that identifies a time of day when the hardware features are to be enabled and a time of day when the hardware features are to be disabled;
a volume feature access group that identifies a set of volumes that are affected by the hardware feature policy;
a job feature access group that identifies one or more jobs that are one or more of allowed and denied access to the one or more hardware features; and a user feature access group that identifies one or more users that are one or more of allowed and denied access to the hardware features.

2. A system, comprising:

a processor and logic integrated with the processor, executable by the processor, or integrated with and executable by the processor, the logic being configured to:

query device support code with an I/O driver;

determine whether one or more hardware features are enabled for one or more hardware components of a system based on the query;

asynchronously update, in response to determining the one or more hardware features are not enabled for at least one of the one or more hardware components, a plurality of host control blocks of the at least one of the one or more hardware components to indicate the hardware features are not enabled for the at least one of the one or more hardware components;

verify a stability of the one or more hardware features in response to detecting the asynchronous update;

define, in response to verifying the stability of the hardware features, a hardware feature policy for one or more hardware components of a system;

build a single channel program to exploit the hardware features in response to defining the hardware feature policy;

selectively and automatically enable, disable, or enable and disable one or more hardware features of one or more of the hardware components based on the hardware feature policy, wherein the hardware feature policy comprises:

instructions to selectively enable access to at least some, but not all of the hardware features based on one or more of a plurality of criteria; and instructions to selectively access to at least some, but not all of the hardware features based on one or more of the plurality of criteria; and wherein disabling the hardware features comprises masking one or more feature codes indicating that a hardware component is configured to utilize the hardware features;

wherein enabling access to the one or more hardware features enables access to a plurality of discontiguous memory pages via the single channel program; and wherein the plurality of criteria comprise:

a feature access schedule that identifies a time of day when the hardware features are to be enabled and a time of day when the hardware features are to be disabled;

a volume feature access group that identifies a set of volumes that are affected by the hardware feature policy;

a job feature access group that identifies one or more jobs that are one or more of allowed and denied access to the one or more hardware features; and a user feature access group that identifies one or more users that are one or more of allowed and denied access to the hardware features.

\* \* \* \* \*